Dec. 13, 1938.                R. W. CARSON                2,139,997
                    ELECTRICAL MEASURING INSTRUMENT
                           Filed May 1, 1937
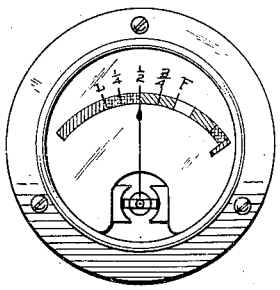
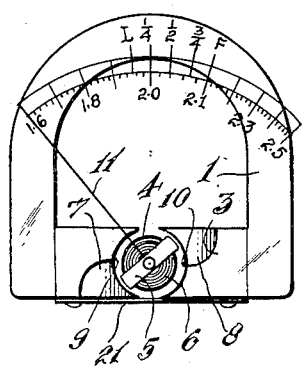
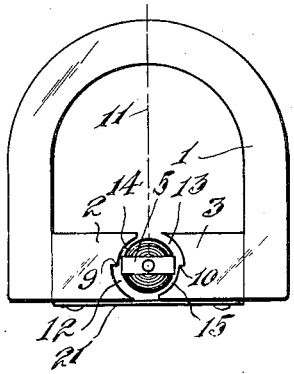
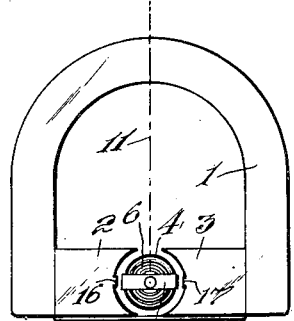
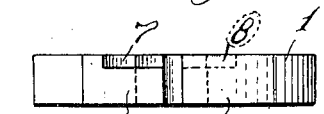
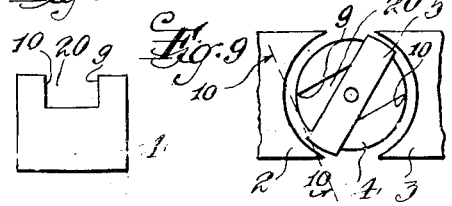
INVENTOR
Robert W. Carson
BY
A. D. T. Libby
ATTORNEY Patented Dec. 13, 1938

2,139,997

UNITED STATES PATENT OFFICE 2,139,997

ELECTRICAL MEASURING INSTRUMENT

Robert William Carson, Little Falls, N. J.

Application May 1, 1937, Serial No. 140,139

5 Claims. (Cl. 171—95)

This invention relates to an electrical measuring instrument particularly adapted for use in indicating the condition of a lead-plate storage battery cell or a plurality of cells. In a slightly different form, the instrument can also be used for nickel-iron storage cells.

It is standard practice at the present time in testing a lead-plate storage battery, to measure the specific gravity of the fluid in each cell and also to measure the voltage of the whole battery while placing the same under a suitable load. A hydrometer test is the one usually relied on as it shows the specific gravity of the electrolyte which bears a known relation to the energy in the storage cell. For example, a lead-plate battery with the usual electrolyte, in a discharged condition, will have a specific gravity of about 1100 on the standard hydrometer, while in a fully charged condition the gravity will be approximately 1300. On the other hand, it is known that the condition of a battery is truly indicated by its open circuit voltage. For example, Vinal's book on Storage Batteries, 1930 edition, on page 173, shows that a discharged battery has an open circuit voltage of 1.95, while a fully charged battery has an open circuit voltage of 2.14. Consequently, the differences that must be measured to indicate the condition of a storage battery between the discharged and fully charged condition is approximately .24 volt or about 10% of the cell voltage. Similar conditions exist for the nickel-iron storage cell with different constants. To read this small change in the open circuit voltage, it is evident that a voltmeter of very high sensitivity and accuracy is required. Large and expensive laboratory instruments, having a scale ten or twelve inches long and reading from zero to 2.5 volts, will give satisfactory scale readings that will indicate the condition of charge, but such instruments are too large and expensive for use by persons who service batteries. Ordinary small voltmeters of reasonable cost and portability do not possess sufficient accuracy and sensitivity for determination of battery charge by measurement of open circuit cell voltage and hence the method of measuring lead-plate battery voltage under load or measurement of specific gravity have been relied upon almost exclusively.

My invention therefore is directed to the design of a small D. C. voltmeter of high sensitivity and accuracy suitable for measuring open circuit cell voltage of lead-plate or nickel-iron storage cells under all practical conditions, whereby the instrument may be used in service testing or for continuous indication of battery condition when continuously connected to batteries in use. Such an instrument, to be successful must be compact, easily portable, permanent in calibration, not too delicate for practical use outside the shop or laboratory, unaffected by variations in outdoor temperatures, and above all, relatively inexpensive in price. At the same time, the scale reading between the discharged and fully charged condition of the battery must be spaced apart so as to be read with precision.

By suppressing the zero position of the pointer, which consists in putting the moving coil control springs under tension when the pointer is at the low end of the scale, whereby an appreciable current is necessary to start the movement of the coil, a conventional D. C. instrument scale can be expanded so as to provide a wider scale range over which to read the differences in open circuit voltage corresponding to changes in charge, but the maximum spacing obtainable is too small for accurate readings on a small inexpensive instrument.

Direct current voltmeters are usually designed with uniform flux density in the A. C. gap so that uniform increments of coil current produce uniform increments in pointer movement and hence uniformly spaced scale divisions.

In the instrument, according to my present invention, however, the magnetic flux in the air gap is not the same for all positions of the pointer as will be hereinafter pointed out, so that for a certain predetermined position of the coil, a unit change in the current therethrough, the pointer deflection is larger than at other positions of the scale. Thus, assuming that a battery cell in its discharged condition has an open circuit voltage of 1.95, and in its fully charged state an open circuit voltage of 2.14, the pointer deflections indicated on the scale of the instrument must be spaced apart sufficiently so that the readings within this range may be easily and accurately read; and it is therefore the principal object of my invention to provide an instrument which will fulfill the conditions heretofore stated for a voltmeter to read the condition of the storage battery from its open circuit voltage without recourse to other methods.

The means by which I accomplish the principal and ancillary objects of my invention are set forth in the annexed drawing, wherein:

Figure 1 illustrates a scale of a laboratory standard voltmeter having a length from ten inches to twelve inches, the figure being reduced in size to get it on the sheet.

Figure 2 illustrates one type of voltmeter according to my invention, reduced in the same proportion as the scale of Figure 1.

Figure 3 is a full-size view of the working parts of one form of my invention showing a scale calibrated in volts; also a superimposed scale indicating the low, intermediate and fully charged points for a lead-plate storage cell. A similar scale with different voltage constants is used to indicate the charge of nickel-iron storage cells.

Figure 4 is a view of a magnet and moving coil system showing a modified form of poles from that shown in Figure 3.

Figure 5 shows another modified form of construction.

Figure 6 is a view looking at the bottom of the magnet shown in Figure 3, with the temperature compensator removed and without the moving coil system.

Figure 7 is a central vertical sectional view through the magnet of Figure 3, looking from right to left, without the moving coil system and the temperature compensating means.

Figure 8 is a view on an enlarged scale of a modified form of construction, in which the core of the instrument is changed to produce the desired results.

Figure 9 is a view similar to Figure 8, but of a further modified form.

Figure 10 is a view on the line 10—10 of Figure 9, looking at the side of the core without the coil.

In Figure 1, I have shown the scale of a laboratory standard voltmeter having a length of from ten to twelve inches, and have illustrated thereon the size of the scale divisions between the points 1.95 and 2.14; or, stated in another way, the range of the pointer position between the open circuit cell voltage for the discharged battery and the fully charged battery, with the ¼, ½ and ¾ charged positions being indicated. From this it is readily seen that when this scale is condensed to the length indicated in the instrument of Figures 2 or 3, these low-to-fully charged scale readings will be so close together as to be impossible to read with any degree of accuracy. In contrast to this, the scale divisions between L and F in both Figures 2 and 3 are spaced wider apart than in other portions of the scale.

I accomplish this result in one of several ways, one way being indicated in Figures 3, 4 and 7, wherein, in combination with a suppressed zero instrument, I is a magnet shown substantially in full size, having poles 2 and 3 extending toward each other in cooperative relationship. Between the faces of the poles 2 and 3, there is positioned a core member 4 around which is adapted to turn a coil 5 controlled by a pair of springs 6, only the top one being shown. The springs 6 have an initial torque so as to suppress the spring zero approximately 180° below the lower end of the visible scale; or, stated in another way, the springs are adapted to withstand a steady angular deflection of 180°, plus a working angle of approximately 90°.

As shown, the scale on this instrument designed for lead-plate storage cells starts at 1.6 and extends to 2.5, but located preferably at the central part of the scale, the divisions are spread out between 1.95 and 2.14, so that it is very easy to read the small voltage variations between these points. Other voltages will apply for nickel-iron storage cells. This is accomplished by suppressing the zero point and by providing a magnet and core system having abrupt change in air gap. In the preferred method shown in Figure 3 the poles 2 and 3 are shaped about as shown at 7 and 8 respectively. In this construction, the coil 5, preferably mounted in the usual way on jewel bearings, is turned by reason of current going therethrough so that it passes between the points 9 and 10. As it enters a restricted portion of the magnetic field in which the flux density is much greater than at other points, the pointer 11, operated by the coil 5, will then be passing over that part of the scale from L to F. It will be noted from Figure 3, that in this method the air gap between the coil 5 and the faces of the poles 2 and 3 is uniform in length and area except where it abruptly changes in length at points 9 and 10. With this construction the scale of the instrument to the left of L, or to the right of F is substantially uniform.

In the construction shown in Figure 4, the faces of the poles 2 and 3 have approximately diametrically opposite portions 12 and 13 of a slightly larger radius, the construction being somewhat exaggerated for better illustration, than the remaining arcuate portions 14 and 15, but at the points 9 and 10 the abrupt changes in the pole faces concentrate the flux to give the same effect as in Figure 3.

In Figure 5, the pole faces have slightly inwardly projecting parts 16 and 17 which may be machined in the pole faces or made in the form of inserts set into slots machined in the pole faces after the poles have been bored to a true diameter. This construction gives a concentration of flux to produce approximately the type of scale readings as in Figure 3.

In Figure 8 the core 4 is provided with diametrically opposite projecting portions 18 and 19, corresponding to the projections 16 and 17 in Figure 5, to produce an equivalent result. Approximately the same concentration of flux can be obtained by modifying but one of the pole faces or only one side of the core in all of the various forms shown.

In Figures 9 and 10, the core 4 is provided with a diagonally positioned channel 20 which acts to give a concentration of flux at the points 9 and 10 which are located approximately diametrically opposite each other, although these points may not necessarily be on a horizontal median line through the faces of the pole pieces, and the core as illustrated in the various views; that is to say, the spread-apart portion of the scale need not necessarily be at the center of the scale, but may be shifted either way. However, I prefer to have this come in the center, as in this position the scale provides portions at either side that are useful in measuring the voltage of batteries while being charged or discharged.

Where the instrument is to be used in places having varying temperatures, I prefer to use a magnetic shunt 21 across the poles of the magnet. I have secured excellent results by using a shunt composition of

|  | Per cent |
|---|---|
| Manganese | ½ |
| Silicon | ¼ |
| Carbon | .2 |
| Nickel | 25 | and the balance iron or an alloy having variable permeability with respect to the temperature. Such a shunt, in the shape of a strip as indicated at 21, I have found will compensate for a considerable range or change in temperature.

I have shown in Figure 2, an instrument having a scale calibrated in fractions of the amount of charge in the storage cell, and I have also indicated on this same scale different colors which may be used to indicate the condition of the battery. For example, the magnified portion of the scale is marked yellow between L and ½, and green between ½ and F. The red at the extreme left of the scale indicates a dead battery, while at the extreme right or charging portion of the scale, the color may be red, indicating that the charge is complete if the instrument is connected to a cell being charged. For a cell being charged at an average rate, the pointer reads over a yellow portion of the scale, while to the right of the yellow portion is a green scale section, indicating that a low charging rate is being used.

However, it is to be remembered that in using this instrument for indicating the condition of a lead plate storage battery, the reading should be taken with the battery cell in a stabilized condition. A lead-plate storage battery requires a little time to acquire a stable condition after a change in the rate of charge or discharge. If a battery has been idle for 10 minutes after a discharge, or 15 hours after a charge, readings can be taken immediately. To read the charge in a cell or battery immediately after charging, a load applied for a few seconds at a high rate, for example, the operation of a starter to an engine to be cranked, or a few minutes at a low rate will stabilize the reading after allowing 10 minutes' rest, for the diffusion of the electrolyte. After a discharge the battery is fully stabilized when the pointer indication remains constant for a minute or more. On an idle battery the instrument always shows the charge directly, regardless of the size or capacity of the battery or cell.

From what has been said, it will be seen that the details for carrying my invention into practice may be somewhat varied from those herein described, without departing from the spirit of my invention, or the scope of the appended claims.

What I claim is:

1. In an electrical measuring instrument for the purpose described, a moving coil system including a spring controlled coil carrying a pointer and a stationary core about the outer periphery of which the coil is adapted to turn, a magnet having pole faces embracing said coil system, said pole faces being formed at a predetermined narrow portion so as to abruptly change the flux through the coil for a short predetermined angular movement thereof and a scale on the instrument to depict by the pointer the movement of said coil, the scale divisions corresponding in spacing and location to the air gap flux variations produced by said portions of predetermined rapid flux change.

2. In an electrical measuring instrument for the purpose described, a permanent magnet having cooperative pole faces, a magnetic core member positioned on the axial center of said pole faces, a moving coil mounted for rotation about the outer periphery of said core and means disposed on the horizontal median line through the pole faces and core for abruptly increasing through a small movement of the coil, the flux through the core and coil when the plane of the coil is substantially parallel with said median line, a scale on the instrument and a pointer moved by the coil to depict on the scale the variations of the flux through the coil.

3. In an electrical measuring instrument for the purpose described, a permanent magnet having cooperative spaced polar areas, a core of magnetic material disposed within the space between said areas, a moving coil extending around the outer periphery of the core and mounted for rotation about said core, its rotation being governed by the magnet flux passing through the polar areas and core, and means for causing the flux to be concentrated through the coil at a predetermined position of the coil and only through a predetermined arcuate movement thereof, and a pointer and scale to depict the differences in movement of the coil throughout its range, the scale divisions over the space wherein the flux is concentrated being materially wider than at other portions of the scale.

4. In an electrical measuring instrument as set forth in claim 3, characterized in that the flux concentration as described herein produces scale readings substantially equal at the low and high portions of the scale while the intermediate portion has its divisions materially separated, whereby the instrument is effective to give spread-out readings for small differences of potential.

5. In an electrical measuring instrument as set forth in claim 3, characterized in that the magnetic material of at least said polar areas is formed to give abrupt change in density of said flux concentration over the predetermined arcuate movement of the coil so as to give more accurate and wider spaced scale readings over this critical space.

ROBERT WILLIAM CARSON.